United States Patent [19]

Van Hecke et al.

[11] 4,451,289

[45] May 29, 1984

[54] PROCESS FOR EXTRACTING NON-FERROUS METALS FROM IRON-BEARING SCRAPS

[75] Inventors: Michel C. Van Hecke, Aartselaar; Luc M. Fontainas, Antwerp, both of Belgium

[73] Assignee: Metallurgie Hoboken-Overpelt, Belgium

[21] Appl. No.: 323,363

[22] Filed: Nov. 20, 1981

[30] Foreign Application Priority Data

Nov. 28, 1981 [LU] Luxembourg ............................ 82970

[51] Int. Cl.³ ...................... C22B 11/00; C22B 15/00
[52] U.S. Cl. ............................................. 75/63; 75/72; 75/83
[58] Field of Search ................................ 75/63, 72, 83

[56] References Cited

U.S. PATENT DOCUMENTS

| 1,125,164 | 1/1915 | Page | 75/76 |
| 3,542,352 | 11/1970 | Themelis | 266/163 |
| 4,055,415 | 10/1977 | Stefan et al. | 75/74 |

FOREIGN PATENT DOCUMENTS

| 469773 | 3/1974 | Australia | 75/73 |
| 446665 | 7/1927 | Fed. Rep. of Germany | 75/73 |
| 2006662 | 9/1970 | Fed. Rep. of Germany | 75/73 |
| 2045174 | 4/1971 | Fed. Rep. of Germany | 75/73 |
| 1783144 | 5/1972 | Fed. Rep. of Germany | 75/73 |
| 2307881 | 11/1976 | France | 75/74 |
| 68939 | 12/1973 | Luxembourg | 75/74 |
| 706227 | 3/1971 | South Africa | 75/73 |
| 239768 | 9/1925 | United Kingdom | 75/73 |
| 1279384 | 6/1972 | United Kingdom | 75/73 |

Primary Examiner—M. J. Andrews
Attorney, Agent, or Firm—Fred Philpitt

[57] ABSTRACT

Non-ferrous metals are extracted from iron-bearing scraps by adding the scraps and a slagging agent for iron to a molten copper bath, injecting an oxygen containing gas in the bath and keeping the bath temperature below 1400°.

The scraps thus undergo an oxidizing smelting in the presence of a molten copper phase and a slagging agent for iron, resulting in a rapid extraction of non-ferrous metals from the scraps into the copper phase and a thorough iron slagging.

8 Claims, 1 Drawing Figure

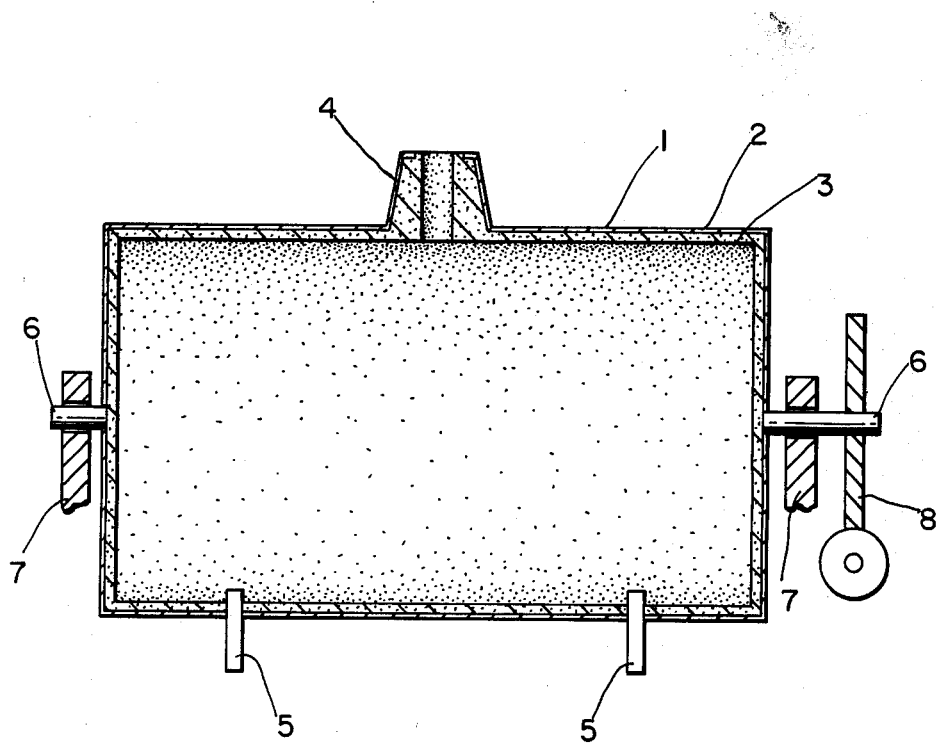

PROCESS FOR EXTRACTING NON-FERROUS METALS FROM IRON-BEARING SCRAPS

BACKGROUND OF THE INVENTION

The present invention relates to a process for extracting non-ferrous metals from iron-bearing scraps containing such metals, in which the scraps are heated in the presence of a copper-bearing material and a slagging agent for iron so as to collect in a copper phase at least part of the non-ferrous metals contained in the scraps and to slag the major part of the iron contained in the scraps.

The iron-bearing scraps, with which the present application is concerned, are for example telephone or electronic scraps, spent or waste catalysts, electric engines, car parts, etc. These iron-bearing scraps may contain valuable metals such as precious metals and copper.

A process such as defined above is described in the U.S. Pat. No. 3,682,623. In this known process a charge is prepared containing
- iron-bearing scraps that contain non-ferrous metals, such as copper-iron scraps,
- copper-bearing materials such as copper-bearing slags and ashes and copper scraps, and
- a slagging agent for iron such as silica, and this charge is melted under a neutral flame thereby producing on the one hand very impure black copper that contains part of the non-ferrous metals originally contained in the iron-bearing scraps and on the other hand a ferrous slag that contains the major part of the iron originally contained in the iron-bearing scraps.

This known process thus requires a heat input to melt the charge and produces a very impure copper phase (black copper) that has still to undergo at least one pyrometallurgical refining operation before one can proceed to its electrorefining. During this electrorefining the valuable metals that come from the iron-bearing scraps are recovered for example as electrolyses slimes when the metals in question are precious metals. The pyrometallurgical refining operation just referred to consists of a converting operation in order to eliminate elements such as Fe, Al, Zn, Pb, Ni et Sb by slagging or volatilisation; that converting operation may produce either directly anode copper, when it is carried out thoroughly, or blister copper that has still to undergo an oxidizing refining in order to yield anode copper.

DISCLOSURE OF THE INVENTION

The aim of the present invention is to provide a process such as defined above, which does not require a heat input and produces a copper phase consisting of blister or anode copper.

According to the invention, the scraps and the slagging agent for iron are added to a molten copper bath, an oxygen containing gas is injected in the bath and the bath temperature is kept below about 1400° C.

The iron-bearing scraps thus undergo an oxidizing smelting in the presence of a molten copper phase and a slagging agent for iron, resulting in a rapid collecting of the non-ferrous metals by the copper phase and a thorough iron slagging.

Since the oxidizing smelting of the iron-bearing scraps is very exothermic, the copper bath temperature tends to increase. It is essential to keep that temperature below about 1400° C. and, preferably, below about 1250° C., because otherwise losses by volatilization of valuable metals such as precious metals becomes noticeable. To this end, the feed rate of the iron-bearing scraps can be modified, inert gases such as nitrogen can be injected in the copper bath, cooling materials such as recycled slag can be added to the copper bath and/or the outside walls of the reactor containing the copper bath can be cooled.

It is thus clear that unlimited quantities of iron-bearing scraps can be treated by the process of the present invention without any heat input, once a molten copper bath is available. It will then, of course, be necessary to discharge regularly from the process reactor the ferrous slag which is formed and to discharge also from time to time a fraction of the copper phase, the volume of this latter increasing slowly as further quantities of iron-bearing scraps are added.

If the ferrous slag that is produced is too rich in valuable metals, for example in copper and/or nickel, to be rejected, those metals can be easily extracted from that slag, for example by slag cleaning in an electric furnace.

The molten copper bath is preferably a molten blister or anode copper bath. A pure copper bath or a very impure copper bath, such as a black copper bath, may also be used. It is clear, however, that using a pure copper bath is expensive and that using a very impure copper bath sets a temperature control problem, the injection of an oxygen containing gas in a very impure copper being already in itself very exothermic.

The drawing shows a cross sectional view of an apparatus for carrying out the process of the present invention.

The process of the invention is advantageously carried out in a side-blown converter such as a Pierce-Smith converter or a syphon converter (Hoboken Converter). The wall of a side-blown converter is made up of a metal plate with a relatively thick refractory lining. Whereas, conventional converters have a wall thickness of about 40 cm, the one which is preferred for carrying out the process of the present invention has a wall thickness of less than about 20 cm in order to allow a high heat loss through the converter wall. Such a preferred converter is illustrated in the accompanying drawing which represents a vertical section through the axis of the converter in blowing position. In this drawing reference numeral 1 designates the converter wall consisting of a metallic casing 2 and a refractory lining 3; 4 is the converter mouth and 5 are tuyeres. The converter is mounted through trunnions 6 in bearings 7 and can be tilted around its axis by means of tilting device 8.

EXAMPLE

In a side-blown converter such as illustrated in the accompanying drawing, with a wall thickness of 11.5 cm, 1,700 kg of black copper containing 81.8% Cu and 20.4 ppm Ag are blown to blister copper, using 127 kg of sand as a slagging agent.

Afterwards, one adds 1,000 kg of iron-bearing scraps containing 16% Cu and 800 ppm Ag at a rate of 361 kg per hour and 550 kg of sand at a rate of 198 kg per hour, while blowing 8 Nm3/minute of air through the tuyeres.

1,200 kg of blister containing 951 ppm Ag are produced.

Hence, 91.3% Ag and 76.5% Cu of the combined feed input are recovered in the final blister. In this specification and in the claims the term "precious metals" means gold, silver and the platinum-group metals.

What is claimed is:

1. A process for extracting copper and/or precious metals from iron-bearing scraps containing such metals which comprises
   (a) adding the scraps and a slagging agent for iron to a molten copper bath,
   (b) injecting an oxygen-containing gas into said bath, and
   (c) maintaining the temperature of said bath below about 1400° C., whereby copper and/or precious metals are extracted from the scraps in the said bath, while slagging the iron of the scraps.

2. The process according to claim 1 wherein said temperature is kept below about 1250° C.

3. The process according to claim 1 or 2 wherein a recycled slag is added to said bath.

4. The process according to claim 1 or 2 wherein an inert gas is injected into said bath.

5. The process according to claim 1 or 2 wherein a side-blown converter is used.

6. The process according to claim 5 wherein at least part of the converter wall has a thickness of less than 20 cm.

7. The process according to claim 5 wherein at least part of the converter wall is cooled by contacting the outer face of this part with a current of air or water.

8. A process according to any of claims 1 or 2 wherein the precious metal extracted is silver.

* * * * *